US000001179H

United States Statutory Invention Registration [19]

[11] Reg. Number: H1179

Keown, decreased et al.

[43] Published: May 4, 1993

[54] VADER PLASMA ARC CASTING

[75] Inventors: William P. Keown, decreased, late of Bethlehem, Pa., by Evelyn Keown, executrix; Ravi Batra, Rockaway, N.J.

[73] Assignee: The United States of America as represented by the Secretary of the Army, Washington, D.C.

[21] Appl. No.: 944,606

[22] Filed: Sep. 14, 1992

Related U.S. Application Data

[63] Continuation of Ser. No. 671,602, Mar. 18, 1991.

[51] Int. Cl.[5] ..... B22D 27/02

[52] U.S. Cl. ..... 164/495

*Primary Examiner*—David H. Brown

*Attorney, Agent, or Firm*—Anthony T. Lane; Edward Goldberg; Michael Sachs

[57] ABSTRACT

A method of casting high melting point metal such as refractory metals into ingots to provide substantially improved strength and density. A quantity of high melting point metal is placed in an arc area of a furnace having a "T" shaped vacuum chamber with a pair of opposing electrodes which generate an arc to cause droplets of the metal to melt from the heat thereby generated. The droplets fall into a mold positioned to receive the droplets and shaped to form the desired ingot. The method includes an additional step of further heating the droplets as they fall into the mold with a plasma arc gun mounted inside the furnace. The gun is directed to impinge its heat torch to control the rate of solidification such that a small pool of the liquid phase is maintained on the ingot. The last step comprises solidifying the molten metal in the ingot by controlling the plasma arc gun and the heat generated from it.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VADER PLASMA ARC CASTING

The invention described herein may be manufactured, used, and licensed by or for the Government for Government purposes without payment to me of any royalties thereon.

This application is a continuation of application Ser. No. 07/671,602, filed Mar. 18, 1991.

FIELD OF THE INVENTION

The present invention relates to a method of casting ingots of high melting point metals, such a refractory metals. More particularly, the present invention relates to a method of casting refractory metals selected from the group consisting of tungsten, rhenium, tantalum and molybdenum, and alloys thereof to achieve unexpected fine grain microstructure, strength and density. The present invention relates to a novel method for forming the ingots of such metals and obtaining superior properties by the use of a unique combination of melting and heating devices.

BACKGROUND OF THE INVENTION

High melting point metal ingots have been prepared by heating a quantity of the metal with a vacuum arc double electrode remelting furnace. Such a device is known by the acronym VADER, and is described in some detail in U.S. Pat. No. 4,261,412. Ingots produced by this method have not been totally useful because of the difficulty in maintaining sufficient heat control of the ingot. As a result, the ingot produced is often coarse grained, brittle and porous. Maintaining sufficient heat to the opposing consumable electrodes can be accomplished with adequate electrical power to maintain a controlled melt delivery. However, because of the inert gas environment, heat losses are too drastic to maintain a controlled heat balance at the top of the developing ingot. A shallow liquid metal zone at the top of this ingot is therefore not maintainable and too rapid solidification of the molten droplets occurs.

The metal droplets consist of a mixture of liquid metal with solid particles in suspension. These particles act as nuclei which produce very fine grains or crystals on solidification. When the solidification is too rapid, the resultant ingot is very porous. Sometimes the droplets do not completely fuse with one another, creating voids and cold shots in the ingot.

Efforts to eliminate the defects produced by this method of casting have not met with adequate success. There has not been a satisfactory method to date for melting and casting ingots of refractive metals using a high melting point process that can result in a fine grained microstructure. The VADER furnace has not been available to cast these metals, except when extremely small amounts of the metal are required.

Accordingly, it is an object of this inve tion to provide a method for casting ingots of high melting point metals, that can maintain a shallow ingot melt pool and thereby provide a fine grained solidified ingot.

More particularly, it is an object of this invention to provide a method for casting ingots of high melting point refractory metals selected from the group consisting of tungsten, rhenium, tantalum and molybdenum, and alloys thereof.

It is a specific object of the present invention to provide a method to produce high melting point metal ingots to achieve unexpected strength and density in those ingots.

Finally, it is an object of the present invention to provide a method of making ingots from refractory metals and the like, using the VADER furnaces.

Other objects will appear hereinafter.

SUMMARY OF THE INVENTION

It has now been discovered that the above and other objects of the present invention may be accomplished in the following manner. Specifically, it has been discovered that high melting point metal ingots can be cast into ingots having superior strength and density.

The method of casting high melting point metal ingots according to the present invention comprising several steps. A quantity of high melting point metal is placed in an arc area of a furnace having a "T" shaped vacuum chamber. A pair of opposing electrodes, in maintaining an arc cause droplets of said metal to melt from the heat thereby generated. In this manner, the droplets fall into a mold which has been positioned to receive said droplets and which is shaped to form the desired ingot size and the like.

The method of this invention further includes heating the droplets as they fall into said mold with a plasma arc gun mounted inside said furnace and directed to impinge upon the top of the ingot to control the rate of solidification. This is done so that a shallow pool of the liquid phase of said metal is always maintained on top of the developing ingot. Finally, the ingot is cooled This is done by controlling said plasma arc gun so that said molten metal in said ingot is solidified without forming coarse or porous grains.

The method is intended for use where the metal is a refractory metal, preferably selected from the group consisting of tungsten., rhenium, tantalum and molybdenum, and alloys thereof.

The plasma gun heats said ingot sufficiently to substantially eliminate voids and cold shots in said ingot upon cooling. The plasma gun is positioned to focus gas plasma on said molten metal in said ingot, said gun being in the transferred mode or in the non-transferred mode.

It has been discovered that the ingots formed from the high melting point metals using the method of this invention have unexpectedly superior strength and density, which has not been possible to achieve in the prior art.

BRIEF DESCRIPTION OF THE DRAWINGS

For a more complete understanding of the present invention, reference is hereby made to the drawings, in which like numbers refer to like elements.

DETAILED DESCRIPTION OF THE INVENTION

The present invention contemplates the use of two separate devices in order to produce sound, high melting point metal ingots or castings. The method of this invention produces ingots of refractory metals such as the group consisting of tungsten, rhenium, tantalum and molybdenum, and alloys thereof to achieve unexpected strength and density.

Figure 1:
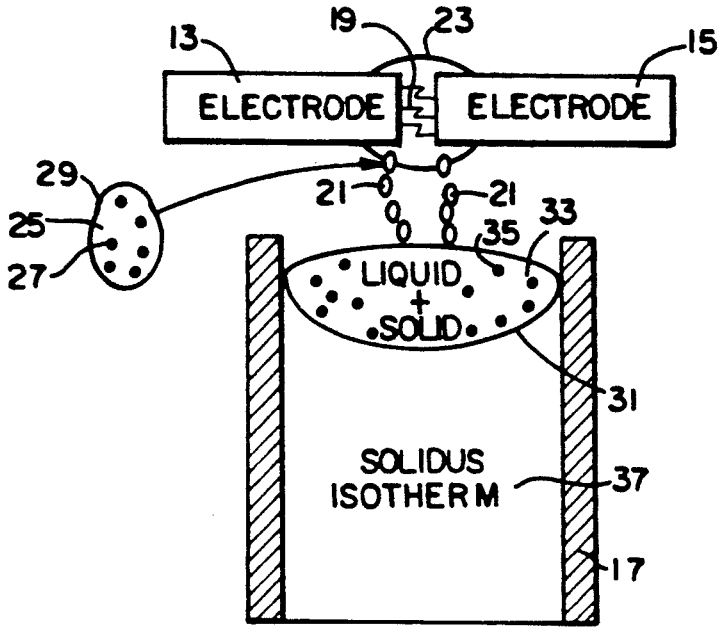
FIG. 1 is a schematic view of a vacuum arc double electrode remelting furnace, which, by itself, represents the prior art method of forming ingots from high melting point metals.

The first device used to heat, melt and then cast the high melting point metals is known by the acronym VADER, which is the Vacuum Arc Double Electrode Remelting method and furnace The VADER., shown schematically in FIG. 1, includes a "T" shaped vacuum chamber 11 generally, in which a horizontal electrode 13 is suspended or mounted opposite an identical horizontal electrode 15, to form the cross bar of the "T".

An ingot mold 17 is place in the stem of the "T", so that it is below the opposed electrodes 13 and 15. An arc 19 is struck and droplets 21 result from the heat generated by the arc 19. These droplets 21 fall from the arc area 23 and are collected in mold 17.

Droplets 21 consist of a mixture of liquid metal 25 with solid particles 27 in suspension, as shown in enlarged droplet 29 The metal which form the droplets 21 from the heat of arc 19 melts at a temperature which is between the solidus temperature and the liquidus temperature of the particular alloy.

Droplets 21 fall into mold 17, where solidification takes place at a solidus isotherm 31. The metal forms a solid, but since the liquid metal 33 contains solid particles 35, these particles 35 act as nuclei which produce very fine grains or crystals on solidification.

The resultant ingot 37 is sometimes very porous if there is rapidh solidification of the ingot 37 at the solidus isotherm 31. This is caused when the droplets 21 do not completely fuse with one another, creating voids and cold shots in the ingot. The VADER furnace has no apparatus to exert temperature control over the metal droplets 21 once the droplets 21 have left the arc area 23 of arc 19.

Figure 2:
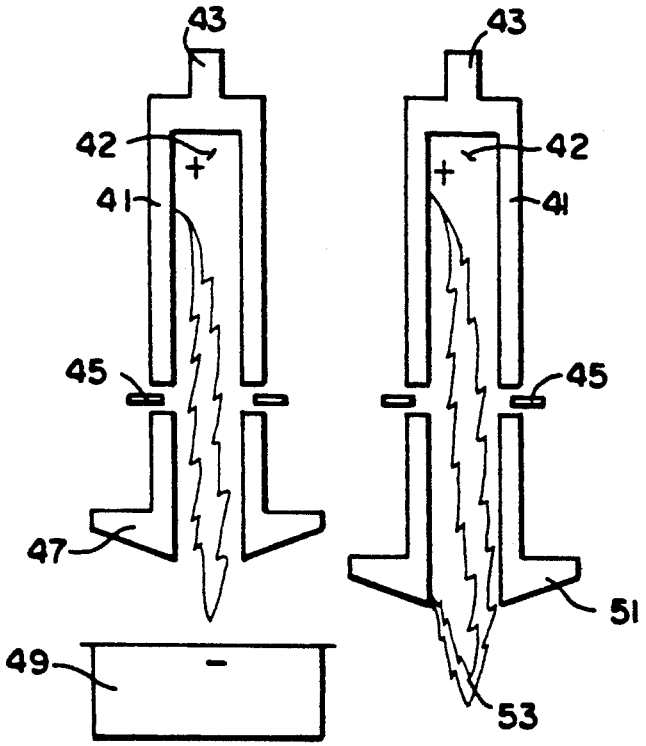
FIG. 2 is a schematic view of two forms of plasma arc melting guns, showing both transferred and non-transferred modes, which guns are placed inside the furnace of FIG. 1 in accordance with the present invention.

The second device used to heat, melt and cast the ingots is a plasma arc melting device. In FIG. 2, a water cooled electrode 41 provides a passage 42 in the center for plasma gas to be pumped, where the gas is ionized and electrically conducted to deliver heat as high as 20,000° C.

The rear electrode 43 is shown as having a positive charge, and the gas injectors 45 transfer plasma gas to a small area with excellent control. The use of a transferred mode, shown on the left of FIG. 2, includes a collimator 47 which allows the blasma arc to impinge on a molten bath 49 to complete the plasma arc transfer Shown on the right of FIG. 2 is a non-transfer mode in which the plasma gas injectors 45 include a front electrode 51 which generates a non-transferred arc 53. The present invention contemplates the use of either a transferred or non-transferred mode of a plasma arc melting device.

The plasma gun is mounted inside the VADER furnace and directed at the top of ingot 37 as it is being formed by droplets 21 from the arc region 23. The heat from the arc 49 or 53 is regulated in such a manner so as to keep the liquid plus solid phase 33–35 in a shallow molten pool, so that the resultant ingot 37 can solidify and produce a sound ingot.

The present invention has been used to solve problems incurred with melting high temperature metals and producing casting of fine grain size, such as that about 50 microns. This has not been possible to achieve prior to the present invention. Until the present invention, ingots have been unsatisfactory due to arc melted refractory metal producing grains which are too coarse or brittle, and ingots which are far too porous. The present invention will permit for the very first time the ability to cast ingots of superior strength and density which has never before been possible in refractory and other high temperature metals.

While the present invention has been described with respect to various embodiments, other modifications and embodiments will become known to one skilled in the art upon reading this description, and the invention is not to be limited except for that which defined by the claims appended hereto.

We claim:

1. A method of casting high melting point metal ingots, comprising the steps of:

placing a quantity of high melting point metal in an arc area of a furnace having a "T" shaped vacuum chamber and a pair of opposing electrodes, and generating an arc to cause droplets of said metal to melt from the heat thereby generated, such that said droplets fall into a mold positioned to receive said droplets and shaped to form the desired ingot;

further heating the droplets as they fall into said mold with a plasma arc gun mounted inside said furnace and directed to impinge a heat source to control the rate of solidification such that the liquid phase and the solid phase of said metal are both molten; and solidifying said molten metal in said ingot by controlling said plasma arc gun.

2. The method of claim 1, wherein said metal is a refractory metal.

3. The method of claim 2, wherein said refractory metal is selected from the group consisting of tungsten, rhenium, tantalum and molybdenum, and alloys thereof.

4. The method of claim 1, wherein said plasma gun will heat said metal sufficiently to substantially eliminate voids and cold shots in said ingot upon cooling.

5. The method of claim 1, wherein said plasma gun is positioned to focus heated gas on said molten metal in said ingot, said gun being in the transferred mode.

6. The method of claim 1, wherein said plasma gun is ingot, said gun being in the non-transferred mode.

7. A method of casting high melting point refractory metal ingots, comprising the steps of:

placing a quantity of high melting point metal in an arc area of a furnace having a "T" shaped vacuum chamber and a pair of opposing electrodes, and generating an arc to cause droplets of said metal to melt from the heat thereby generated, such that said droplets fall into a mold positioned to receive said droplets and shaped to form the desired ingot;

further heating the droplets as they fall into said mold with a plasma arc gun mounted inside said furnace and directed to impinge a plasma at a temperature sufficiently hot to substantially eliminate voids and cold shots in said ingot upon cooling and control the rate of solidification such that the liquid phase and the solid phase of said metal are both molten; and solidifying said molten metal in said ingot by controlling said plasma arc gun.

8. The method of claim 7, wherein said refractory metal is selected from the group consisting of tungsten, rhenium, tantalum and molybdenum, and alloys thereof.

9. The method of claim 7, wherein said plasma gun is positioned to focus heated gas on said molten metal in said ingot, said gun being in the transferred mode.

10. The method of claim 7, wherein said plasma gun is positioned to focus heated gas on said molten metal in said ingot, said gun being in the non-transferred mode.

* * * * *